United States Patent
Subramanian et al.

(10) Patent No.: US 8,688,839 B2
(45) Date of Patent: Apr. 1, 2014

(54) INTELLIGENT CONNECTION MANAGER

(75) Inventors: Vijayaraman J. Subramanian, Hyderabad (IN); Kedar V. Phadke, Hyderabad (IN); Karunakar Thota, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 291 days.

(21) Appl. No.: 13/309,816

(22) Filed: Dec. 2, 2011

(65) Prior Publication Data

US 2013/0144946 A1  Jun. 6, 2013

(51) Int. Cl.
*G06F 15/16* (2006.01)
*G06F 15/173* (2006.01)

(52) U.S. Cl.
USPC ........... 709/226; 709/223; 709/227; 709/228; 709/229

(58) Field of Classification Search
USPC ............. 709/223, 226, 227, 228, 229; 706/12
See application file for complete search history.

(56) References Cited

U.S. PATENT DOCUMENTS

| | | | |
|---|---|---|---|
| 6,963,917 B1* | 11/2005 | Callis et al. | 709/227 |
| 6,965,930 B1* | 11/2005 | Arrowood et al. | 709/223 |
| 7,437,460 B2* | 10/2008 | Chidambaran et al. | 709/226 |
| 7,756,959 B1* | 7/2010 | Beshai et al. | 709/223 |
| 8,429,096 B1* | 4/2013 | Soundararajan et al. | 706/12 |
| 8,429,097 B1* | 4/2013 | Sivasubramanian et al. | 706/12 |

* cited by examiner

*Primary Examiner* — Quang N Nguyen

(57) ABSTRACT

Methods, devices, and storage media may provide for receiving a request from a subscriber device for a connection service pertaining to a machine-to-machine communication; determining whether the request is a valid request for the connection service; selecting a connection to a target device of the machine-to-machine communication in response to determining that the request is valid; executing a command included in the request to be directed to the target device; receiving a response from the target device; and transmitting the response to the subscriber device of the machine-to-machine communication.

19 Claims, 16 Drawing Sheets

INTELLIGENT CONNECTION MANAGER

BACKGROUND

Machine-to-machine (M2M) communications has expanded to a variety of Applications, such as utilities, vending machines, point of sales terminals, transport and logistics, healthcare, security, financial services, etc. A machine-to-machine communication may traverse a variety of networks operating according to different standards to provide a communication link between devices.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "machine-to-machine" communications, as used herein, is intended to be broadly interpreted to include communication between two or more devices. Additionally, it is intended that other terms and their meanings, such as, for example, device-to-device (D2D) communications, and/or telemetry, are incorporated into the term machine-to-machine communications. A machine-to-machine communication may occur via a wireless connection and/or a wired connection.

According to an exemplary embodiment, an intelligent connection manager provides connection services for machine-to-machine communications. According to an exemplary embodiment, the intelligent connection manager maintains a connection pool. The connection pool provides a pool of active connections for gaining access to devices targeted for machine-to-machine communications. According to an exemplary implementation, the intelligent connection manager creates a new connection if no active connections are available in the pool. According to another exemplary implementation, the intelligent connection manager queues requests if no active connections are available. According to yet another implementation, the intelligent connection manager requests permission to modify (e.g., temporarily or permanently) connection service limits (e.g., a number of active connections) if connection service limits are being exceeded.

According to an exemplary embodiment, the intelligent connection manager receives requests from subscriber devices for connections with the intelligent connection manager. These requests are authenticated, authorized, and service level agreement parameters are identified. The intelligent connection manager selects a connection from the connection pool. When a communication link is established between the subscriber device and the target device via the intelligent connection manager, machine-to-machine data may be communicated.

According to an exemplary embodiment, the intelligent connection manager audits each connection service request. Audit information is stored and may be used for various purposes, as described herein. According to an exemplary embodiment, the intelligent connection manager provides transcoding and/or translating services pertaining to the machine-to-machine data. For example, machine-to-machine data may be converted according to service level agreement parameters.

Figure 1:
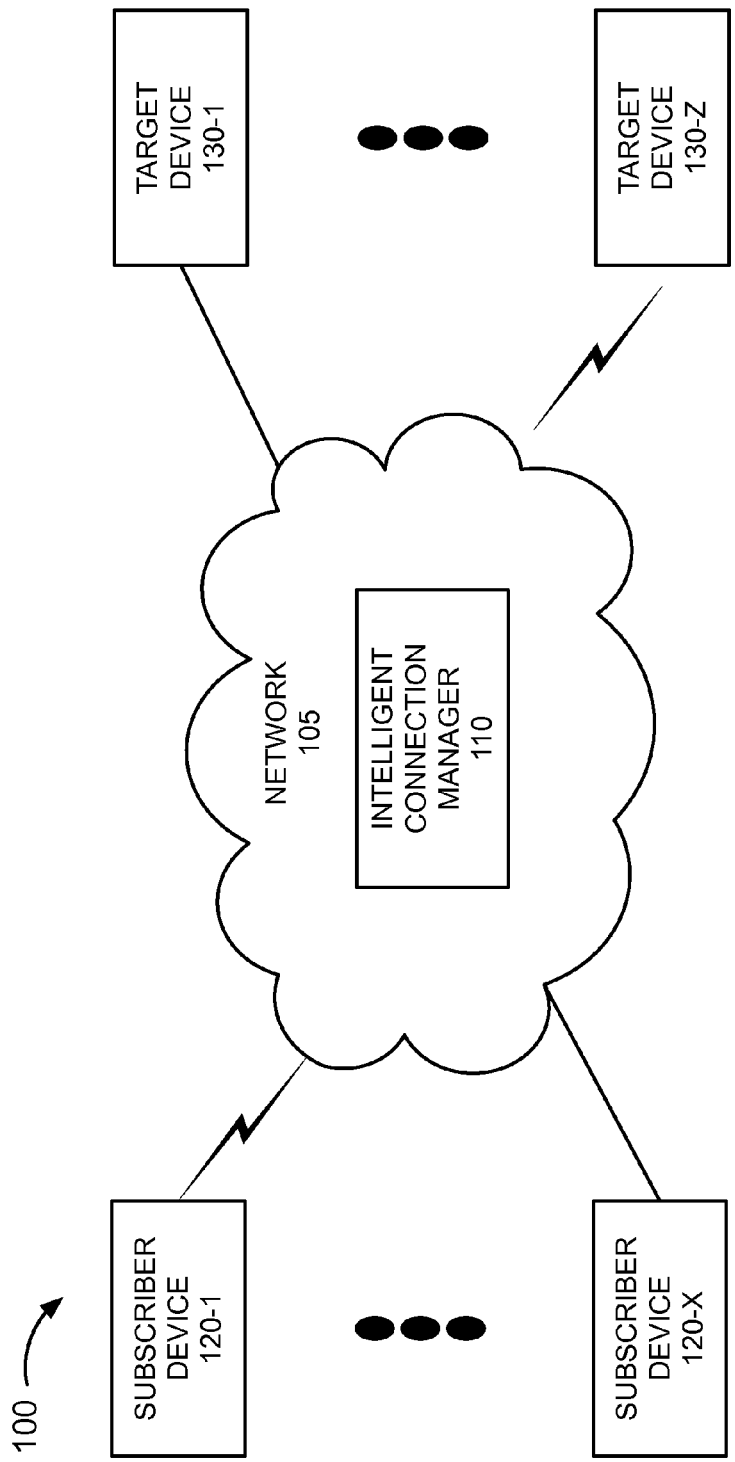
FIG. 1 is a diagram illustrating an exemplary environment in which an exemplary embodiment of an intelligent connection manager may be implemented.

FIG. 1 is a diagram illustrating an exemplary environment in which an exemplary embodiment of an intelligent communication manager may be implemented. As illustrated, environment 100 includes a network 105 that includes an intelligent connection manager 110. Additionally, environment 100 includes subscriber device 120-1 to subscriber device 120-X, in which X>1 (also referred to collectively as subscriber devices 120 and individually as subscriber device 120) and target device 130-1 to target device 130-Z, in which Z>1 (also referred to collectively as target devices 130 and individually as target device 130).

According to other embodiments, a single device in FIG. 1 may be implemented as multiple devices and/or multiple devices may be implemented as a single device. A device may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, or a combination thereof). Environment 100 may be implemented to include wired and/or wireless connections among the devices illustrated.

Network 105 includes one or multiple networks. For example, network 105 may be implemented as the Internet or another type of Internet Protocol (IP)-based network. Alternatively, network 105 may be implemented as a wide area network (WAN), a metropolitan area network (MAN), a mobile network, a public network, a private network, a wireless network, a wired network, various combinations thereof, etc.

Intelligent connection manager 110 includes a network device that provides connection services pertaining to machine-to-machine communications, as described herein. Intelligent communication manager 110 may be implemented as a computational device (e.g., a computer), a server device that hosts a server application (e.g., a Web server, an application server, etc.) and/or other suitable network device. Intelligent communication manager 110 may include a mass storage device to store subscriber information and a data management system to manage the subscriber information, as described herein.

Subscriber device 120 includes a device, such as a network device or a user device. For example, subscriber device 120 may be implemented as a computer, an information technology (IT) system, a mobile device, a monitoring device, a controller device, etc.

Target device 130 includes a device, such as a network device or a user device. For example, target device 130 may be implemented as a router, a switch, a security device, a mobile device, a set top box, a multiplexer, a gateway device, a computer, a booster, a chassis, customer premise equipment, etc.

Figure 2:
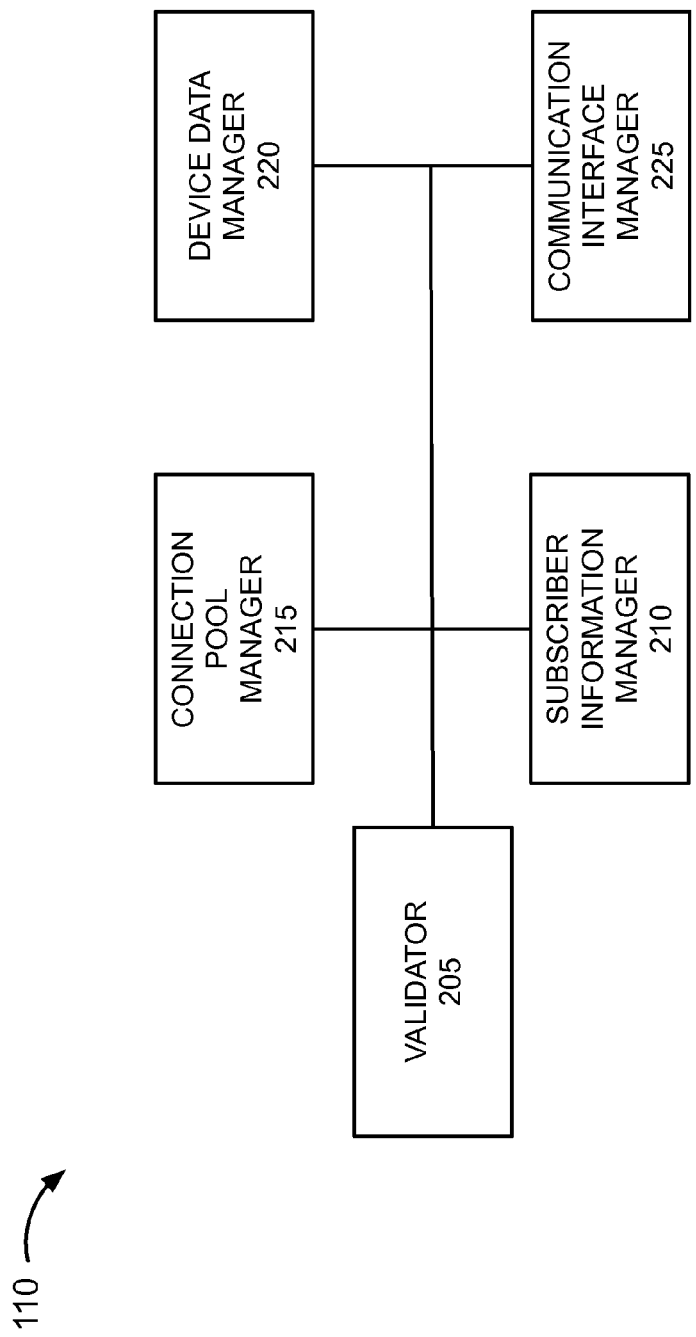
FIG. 2 is a diagram illustrating an exemplary embodiment of an intelligent connection manager.

FIG. 2 is a diagram illustrating an exemplary embodiment of intelligent communication manager 110. As illustrated, intelligent communication manager 110 includes a validator 205, a subscriber information manager 210, a connection pool manager 215, a device data manager 220, and a communication interface manager 225.

According to other embodiments, intelligent communication manager 110 may be implemented with additional, fewer, and/or different components or devices than those illustrated in FIG. 2 and described herein. Also, according to other embodiments, one or more functions and/or processes described as being performed by a particular component or device may be performed by a different component or device, or some combination of components or devices.

Validator 205 validates subscriber requests for connection services provided by intelligent connection manager 110. According to an exemplary embodiment, validator 205 authenticates and authorizes subscriber devices 120. Validator 205 may also verify other aspects of subscriber requests and other types of machine-to-machine messages, such as identification of a target device, format and syntax of a machine-to-machine message, a command, a function, and/or a process to perform, and/or other data, parameters, etc., included in the subscriber request and other types of machine-to-machine messages.

Subscriber information manager 210 stores and manages subscriber information. For example, subscriber information includes information to authenticate and authorize subscriber device 120. Additionally, for example, subscriber information includes service level agreement information pertaining to connection services. For example, the service level agreement information may specify the number of connection requests permitted at one time, per day, etc., resource utilization limitations, target devices 130, subscriber devices 120, elections pertaining to situations when an overage occurs, data formats/protocols to use, etc.

Subscriber information manager 210 collects machine-to-machine session information pertaining to the connection services provided by intelligent connection manager 110. For example, machine-to-machine session information includes time information (e.g., start/end times), subscriber device 120 identifier, target device 130 identifier, subscriber commands, functions, and/or processes received to perform or cause to perform on target device 130, and target device 130 response information. According to an exemplary embodiment, subscriber information manager 210 generates reports based on the machine-to-machine session information. The reports provide a basis for measuring a subscriber's usage of the connection services. Additionally, according to an exemplary implementation, reports (e.g., daily, weekly, monthly, etc.) are made available to subscribers. Based on the reports, a subscriber may monitor usage and determine a suitable connection service level that meets the subscriber's demands.

Connection pool manager 215 manages a pool of active connections for gaining access to target devices 130. Connection pool manager 215 selects active connections in the pool to service subscriber requests for connection services. According to an exemplary implementation, connection pool manager 215 queues subscriber requests if no active connections are available. According to another exemplary implementation, connection pool manager 215 creates new connections to target devices 130 as long as the new connection is within the connection interface limits (e.g., the number of allowable connections) of target devices 130. Additionally, or alternatively, connection pool manager 215 may determine whether to create new connections based on service level agreement information. For example, creating new connections may be an optional service to which subscribers may subscribe. According to another implementation, for connection requests that exceed a service connection limit (e.g., a concurrent connection limit, etc.), connection pool manager 215 may request permission to subscriber device 120 or some other device to increase the service connection limit. If permission is granted, the service connection limit is increased (e.g., temporarily or permanently). If permission is not granted, the request is queued until the connection service status is within the service level agreement terms.

Device data manager 220 formats machine-to-machine data to formats compatible with the devices involved in a machine-to-machine communication (e.g., subscriber device 120, target device 130). For example, device data manager 220 parses and converts machine-to-machine data to a format according to subscriber information.

Device data manager 220 also interprets machine-to-machine data (e.g., subscriber device requests, target device responses, etc.) and provides appropriate connection services in response to such interpretations.

Communication interface manager 225 supports various protocols and wired/wireless standards to communicate with subscriber devices 120 and target devices 130. For example, communication interface manager 225 supports Hypertext Transfer Protocol (HTTP), Hypertext Transfer Protocol Secure (HTTPS), Simple Network Management Protocol (SNMP), Secure Shell (SSH), Telnet, Command-Line Interface (CLI), proprietary, and other known protocols and interfacing formats. Communication interface manager 225 maintains the active connections in the pool. These connections may be direct or indirect connections to target devices 130.

Figure 3:
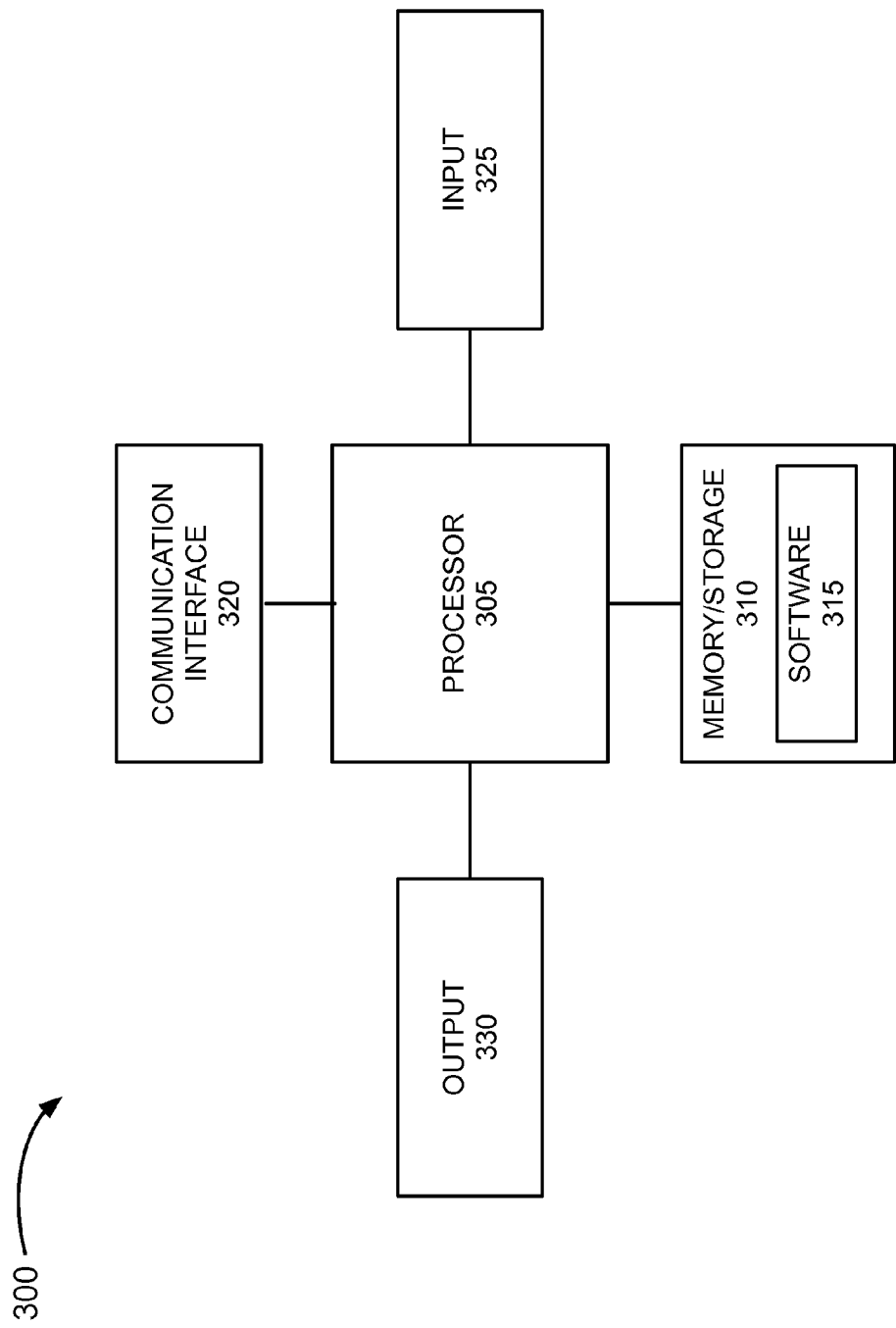
FIG. 3 is a diagram illustrating exemplary components of a device that may correspond to one or more of the devices in the environment depicted in FIGS. 1 and 2.

FIG. 3 is a diagram illustrating exemplary components of a device 300 that may correspond to one or more of the devices depicted in FIGS. 1 and 2. As illustrated, according to an exemplary embodiment, device 300 includes a processor 305, memory/storage 310 storing software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., memory/storage 310), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a program that provides a function and/or a process. Software 315 may include firmware. Communication interface 320 may permit device 300 to communicate with other devices, networks, systems, etc. Communication interface 320 may include one or multiple wireless interfaces and/or wired interfaces. Communication interface 320 may include one or multiple transmitters, receivers, and/or transceivers. Communication interface 320 may operate according to one or multiple protocols, standards, and/or the like.

Input 325 may permit an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 may permit an output from device 300. For example, output 330 may include a speaker, a display, a touchscreen, a touchless screen, a light, an output port, and/or some other type of visual, auditory, tactile, etc., output component.

Device 300 may perform processes and/or functions, as described herein, in response to processor 305 executing software 315 stored by memory/storage 310. By way of example, the instructions may be read into memory/storage 310 from another memory/storage 310 or from another device via communication interface 320. The instructions stored by memory/storage 310 may cause processor 305 to perform one or more processes described herein. Alternatively, for example, according to other implementations, device 300 may perform one or more processes described herein based on the execution of hardware (processor 305, etc.), the execution of firmware with hardware, or the execution of software and firmware with hardware.

Figure 4A:
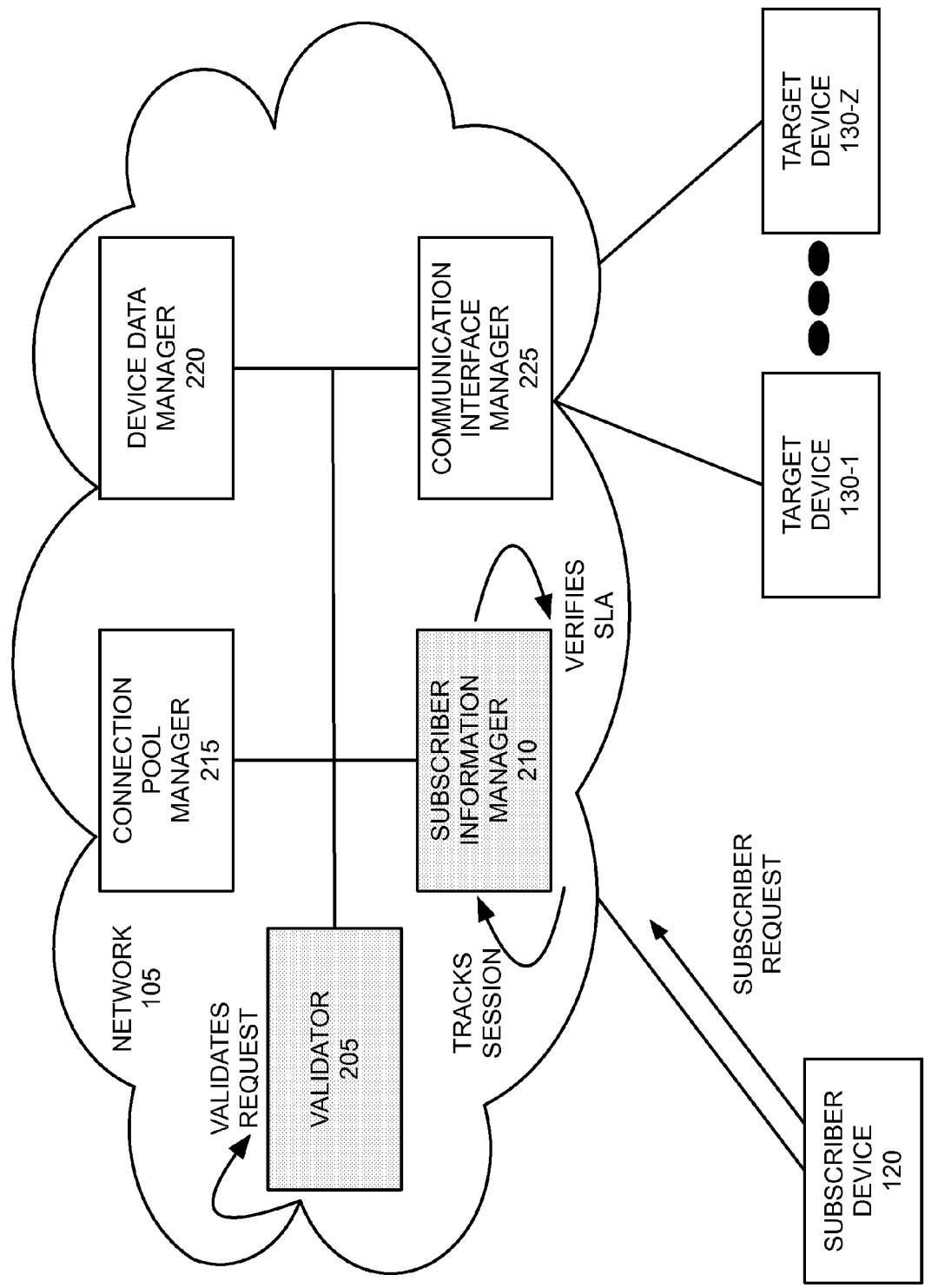
FIGS. 4A-4E are diagrams illustrating an exemplary process performed by an intelligent connection manager according to exemplary scenario.

FIGS. 4A-4E are diagrams illustrating an exemplary process performed by intelligent connection manager 110 according to exemplary scenario. Referring to FIG. 4A, subscriber device 120 transmits a subscriber request to intelligent connection manager 110. Validator 205 receives the request and validates the request. For example, a validation process may include authentication, authorization, and syntax verification pertaining to the format and data included therein. According to an exemplary implementation, the subscriber request includes a subscriber identifier and an authentication code. The subscriber request also includes one or more commands pertaining to the connection with target device 130. According to this scenario, assume that the subscriber request is validated. In a situation when the subscriber request is not validated, intelligent connection manager 110 transmits a subscriber response indicating a rejection of connectivity and/or connection services.

As further illustrated, subscriber information manager 210 tracks session information pertaining to the subscriber request and throughout the session until the session is terminated. Additionally, subscriber information manager 210 verifies service level agreement (SLA) parameters. For example, subscriber information manager 210 identifies current usage levels pertaining to this subscriber. According to this scenario, assume that there are no issues pertaining to the service level agreement parameters. In a situation when there is an issue (e.g., overage usage, etc.), intelligent connection manager 110 would respond according to processes described elsewhere in this description.

Figure 4B:
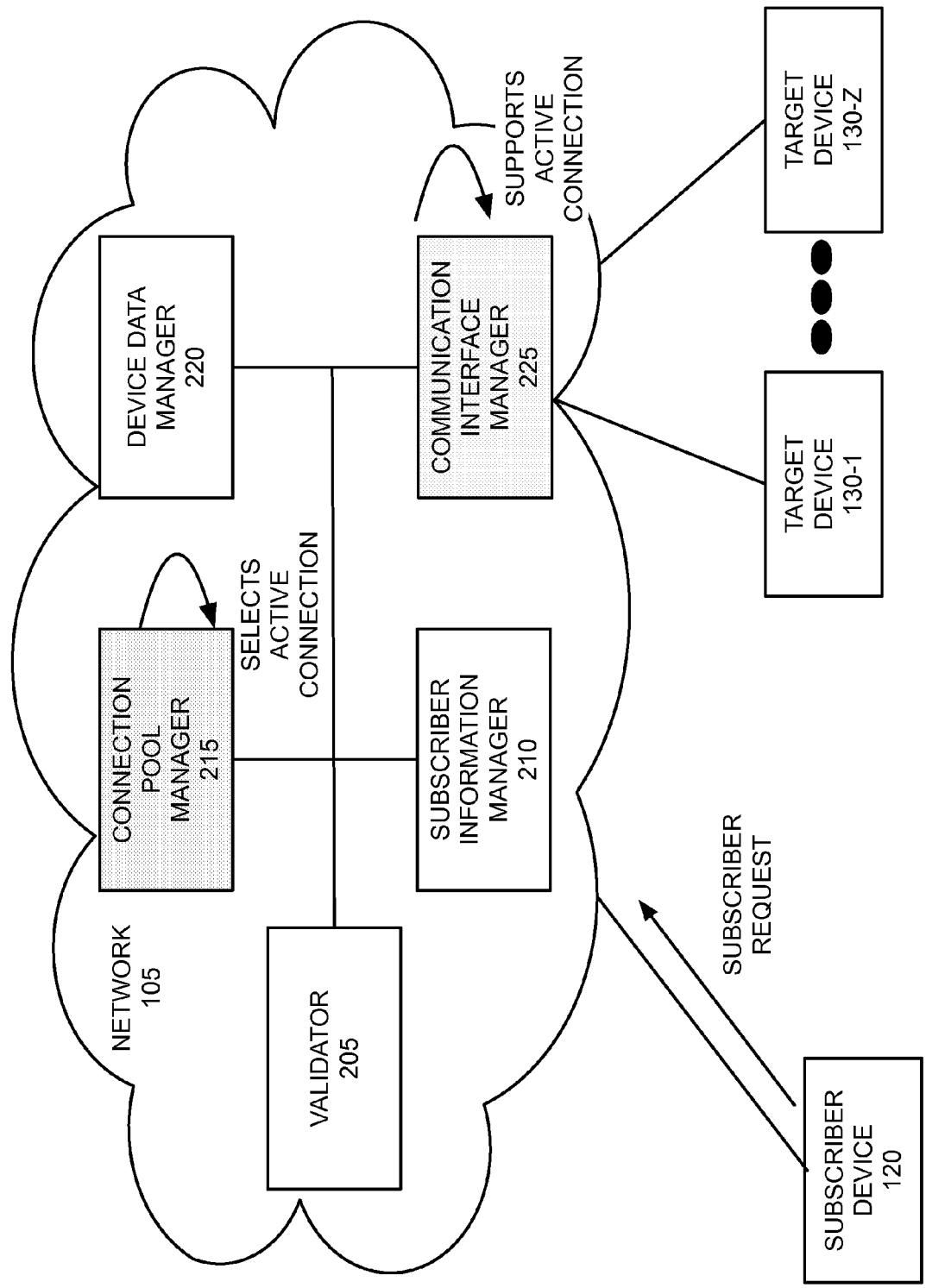

Referring to FIG. 4B, assume that subscriber device 120 wants a connection to target device 130-1. According to this scenario, assume that a connection pool includes an unused, active connection to target device 130-1 and that no other connections exist relative to target device 130-1. Connection pool manager 215 selects the active connection to target device 130-1. In a situation when there is no unused, active connection available (e.g., in the connection pool), connection pool manager 215 queues the request until an unused, active connection becomes available.

Communication interface manager 225 supports the active connection selected by connection pool manager 215. For example, communication interface manager 225 may use subscriber information to identify the appropriate protocol and/or interface mechanism to maintain an active connection with target device 130-1.

Figure 4C:
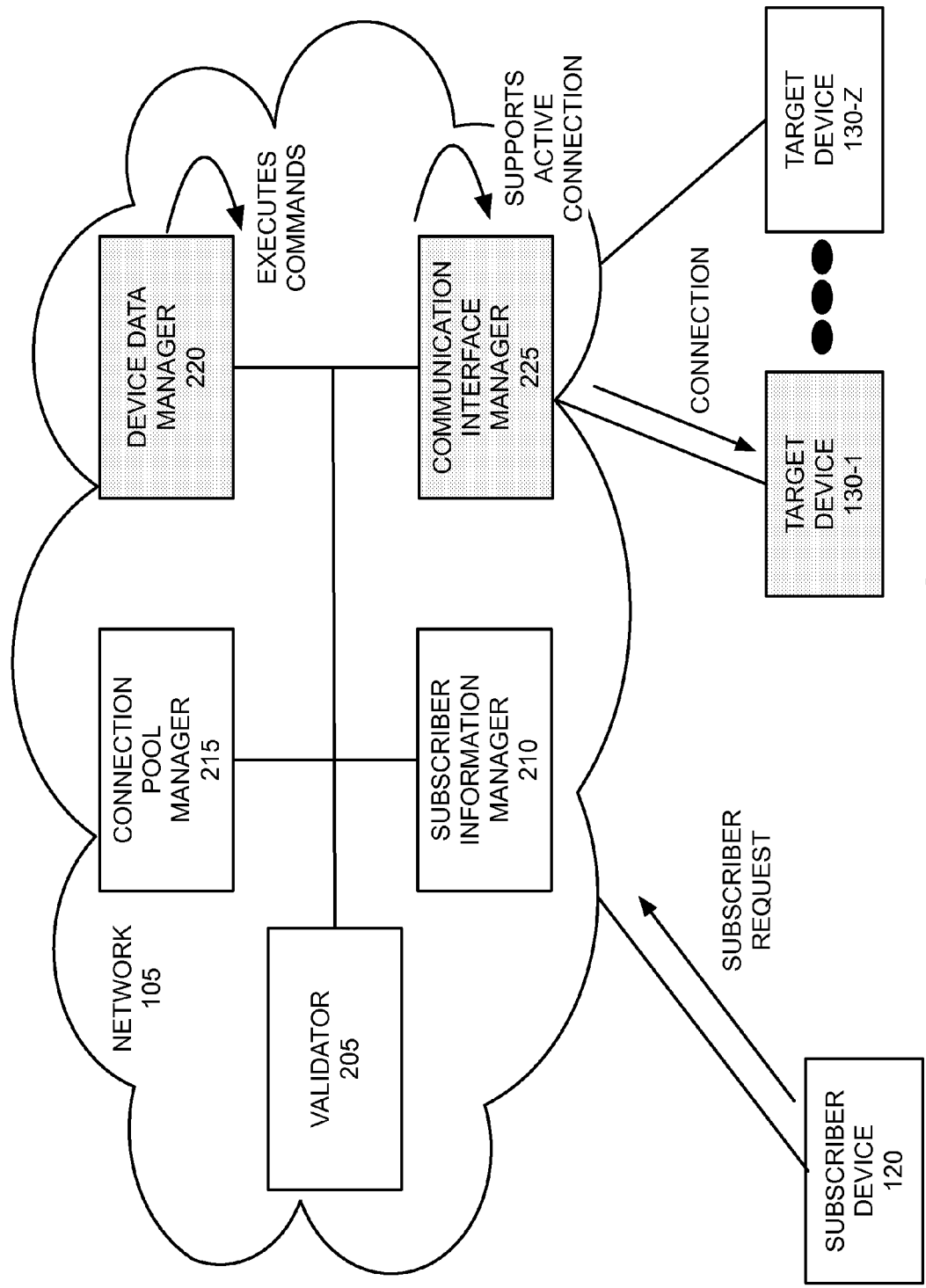

Referring to FIG. 4C, device data manager 220 executes a command included in the subscriber request on target device 130-1. According to this scenario, assume that the subscriber request included commands to cause target device 130-1 to execute an activation process for activating a new service based on the commands executed by device data manager 220.

Figure 4D:
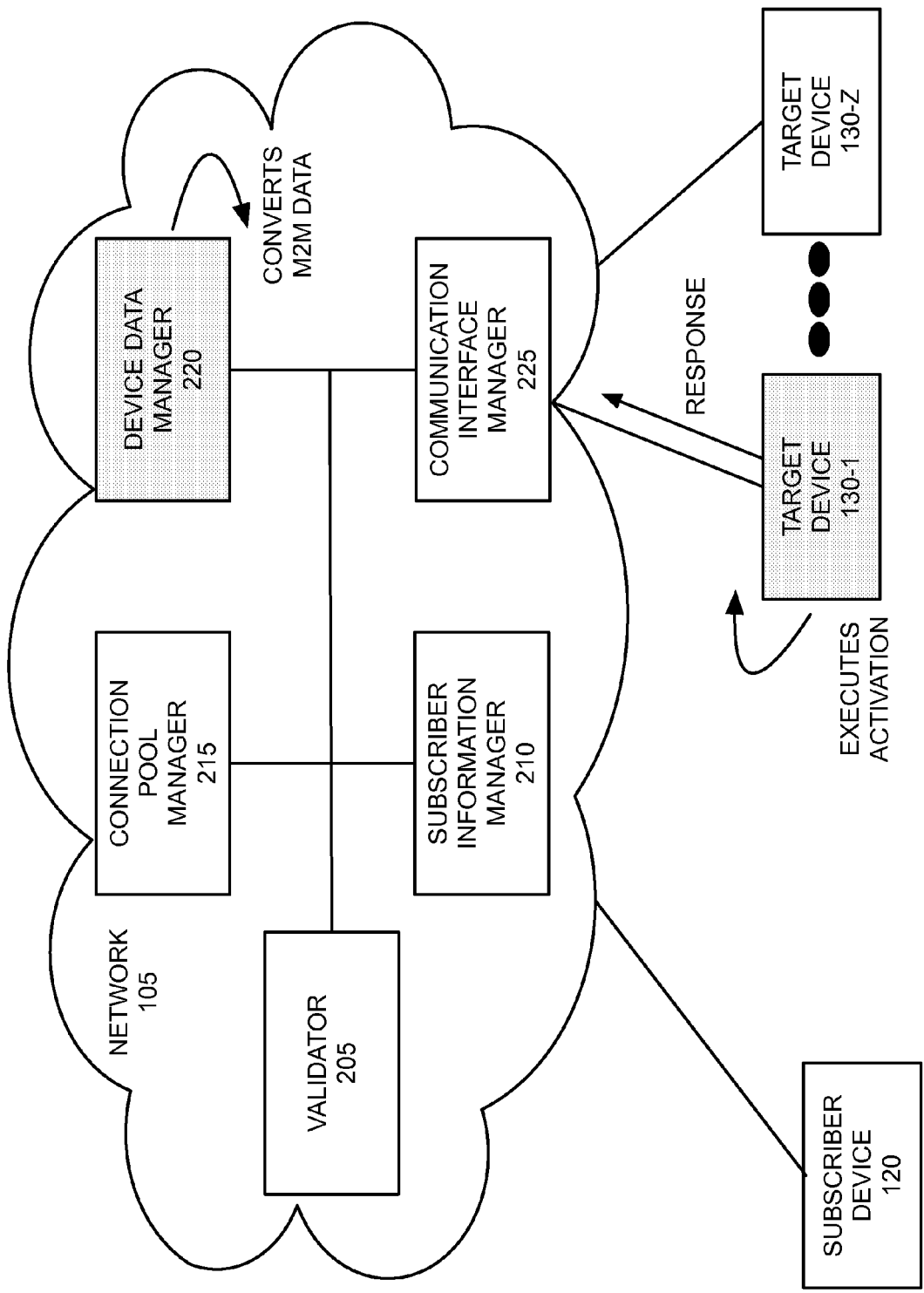
Figure 4E:
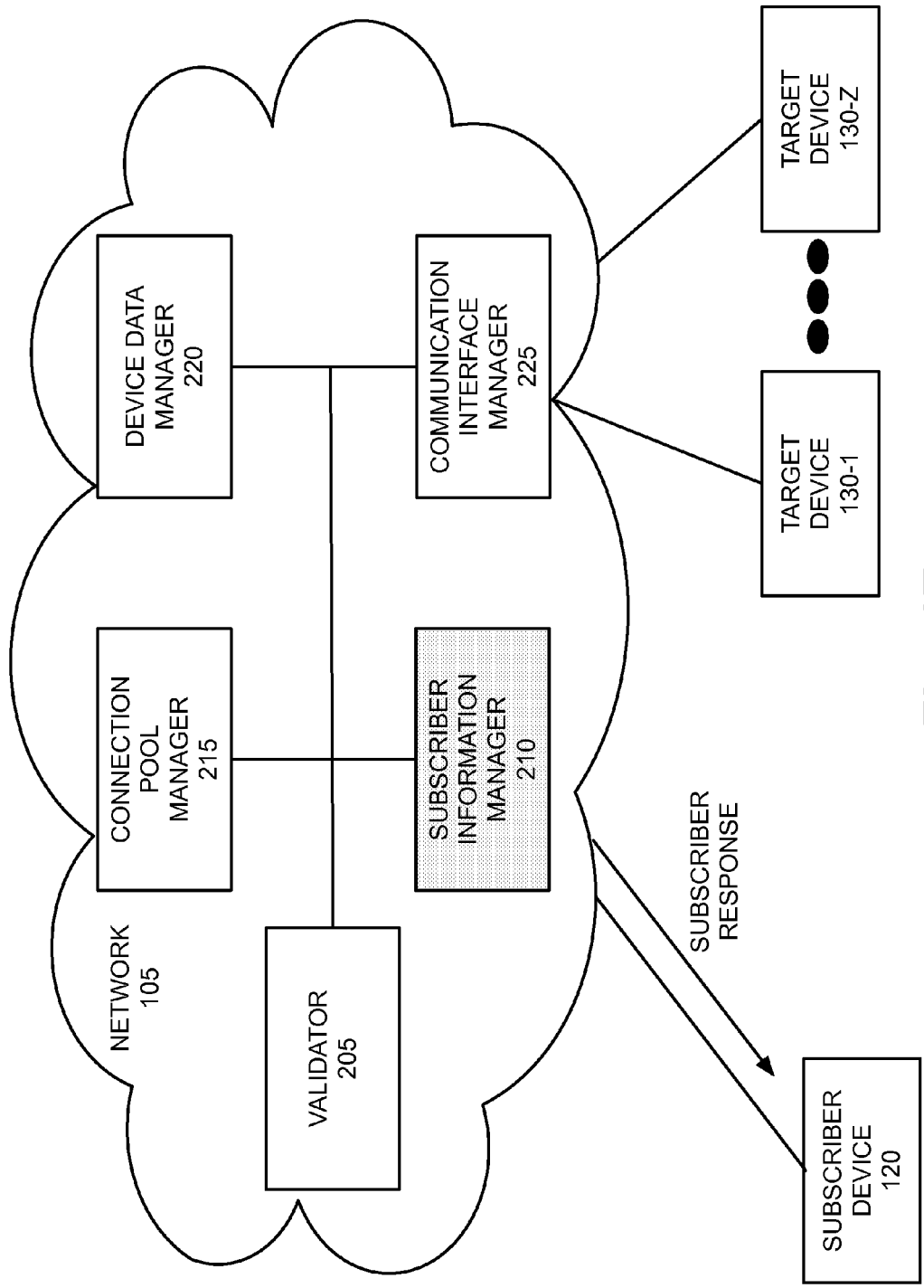

Referring to FIG. 4D, target device 130-1 executes the activation commands and provides a response to intelligent connection manager 110. According to this scenario, assume that machine-to-machine data included in the response is to be converted. Device data manager 220 converts the machine-to-machine data. For example, device data manager 220 converts the machine-to-machine data based on a format specified in the subscriber information (e.g., in a format understandable to subscriber device 120). In FIG. 4E, subscriber device 120 receives a subscriber response. For example, the subscriber response includes an indication that target device 130-1 successfully activated the new service.

FIGS. 5A-5E are diagrams illustrating another exemplary process performed by intelligent connection manager 110 according to an exemplary scenario. According to this example, it may be assumed that intelligent connection manager 110 is implemented as an elastic cloud in which resources are dynamically allocated and de-allocated. Also, according to this scenario, assume that subscriber device 120 hosts a proactive diagnostic application (e.g., an intelligent test system (ITS)) that automatically performs diagnostics of a customer circuit based on circuit behavior of the customer service or in the case of a customer complaint/ticket. For example, a customer ticket may be generated by a customer using a business-to-business tool (e.g., software) that permits customer site bonding with subscriber device 120. Further assume, according to this scenario, that the service level agreement for the subscriber provides that intelligent connection manager 110 is limited to servicing no more than 50 requests concurrently.

Figure 5A:
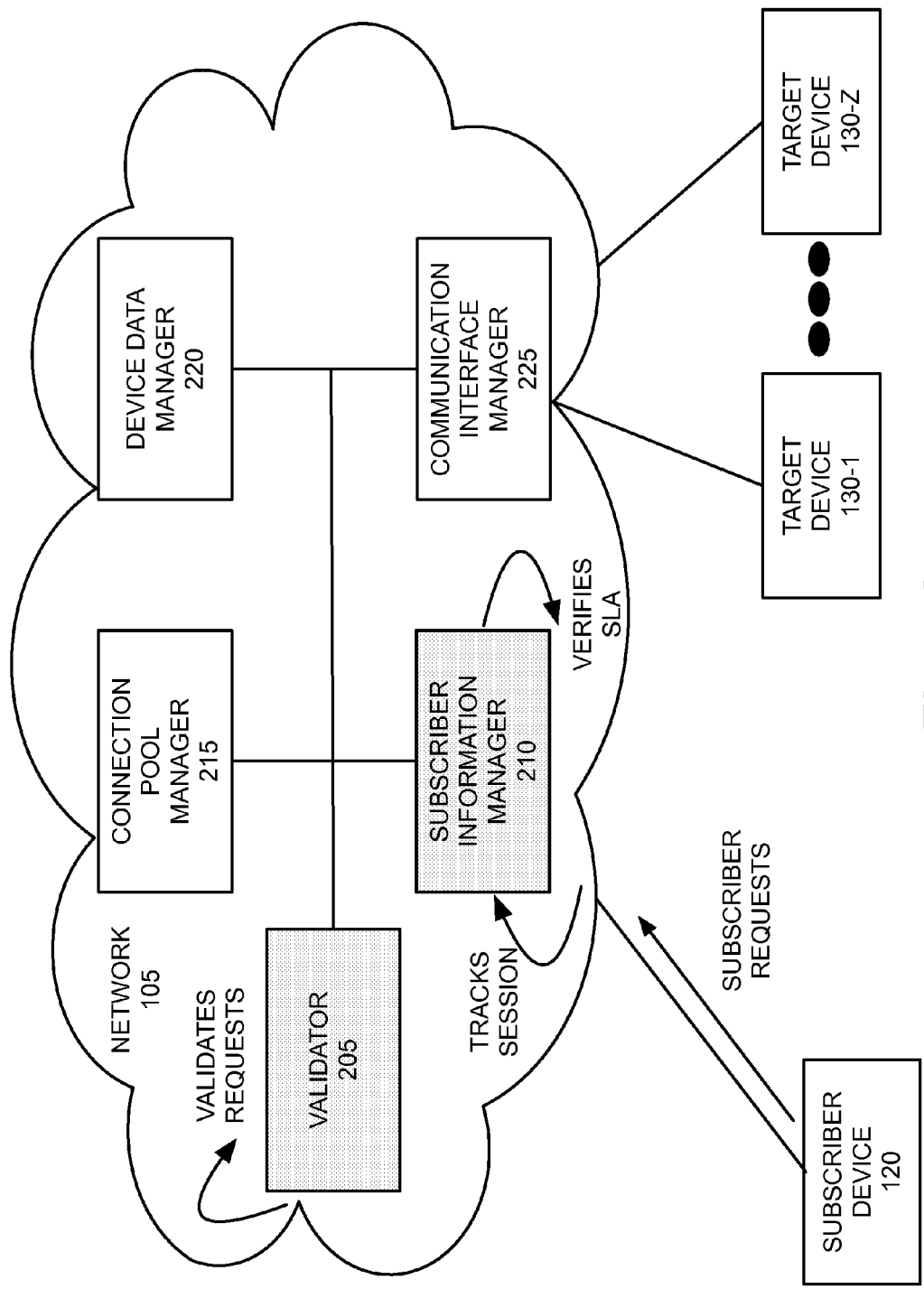
FIGS. 5A-5E are diagrams illustrating another exemplary process performed by an intelligent connection manager according to an exemplary scenario.

Referring to FIG. 5A, assume there is a network outage (e.g., due to weather) and there is a sudden burst of tickets flowing to subscriber device 120. In response, subscriber device 120 wants to obtain performance data from target devices 130 (e.g., routers). Subscriber device 120 simultaneously transmits to intelligent connection manager 110 a number of subscriber requests (e.g., 25 requests) to obtain performance data from one or more of target devices 130 (e.g., one or more routers). Similar to that previously described, validator 205 validates the subscriber requests and subscriber information manager 210 tracks session information and verifies service level agreement parameters. Since the service limit for this subscriber is 50 concurrent requests, there is no usage issue.

Figure 5B:
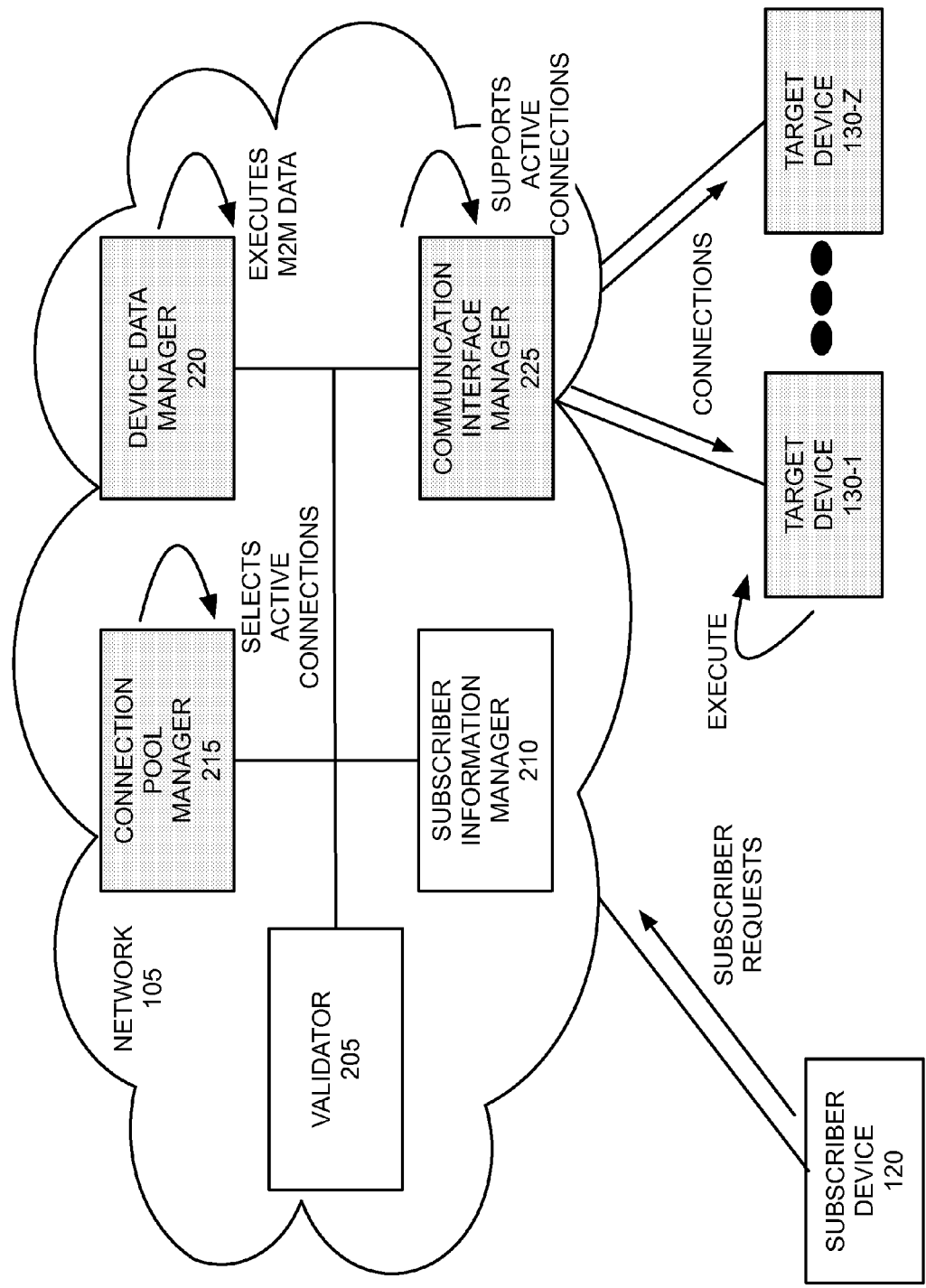

Referring to FIG. 5B, connection pool manager 215 selects active connections to target devices 130. Communication interface manager 225 supports the active connections and interface mechanisms relative to target devices 130, and device data manager 220 executes commands to cause the one or more target devices 130 to provide performance data. As further illustrated, target devices 130 begin to execute processes for obtaining performance data in response to intelligent connection manager requests.

Figure 5C:
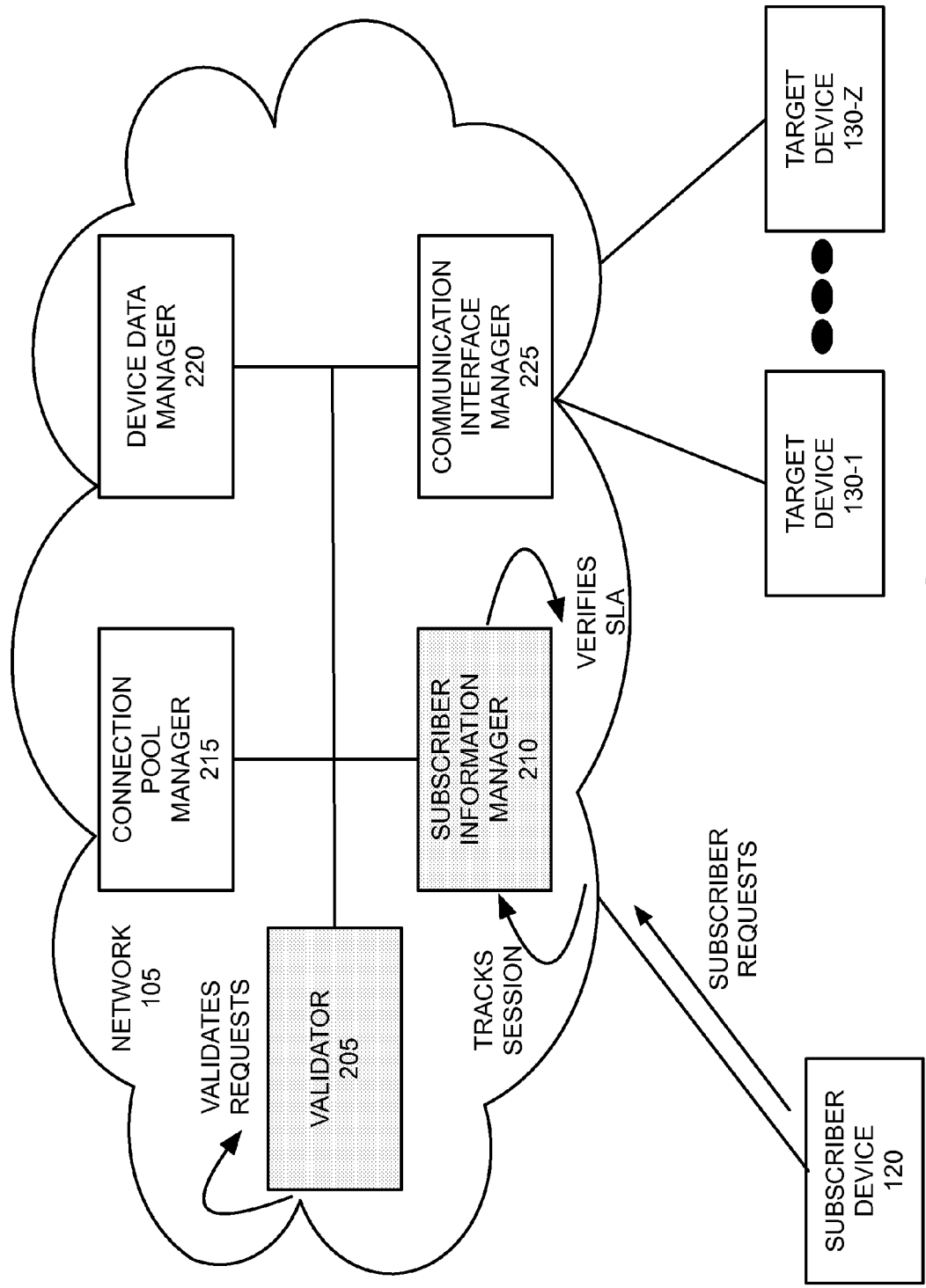

Referring to FIG. 5C, subscriber device 120 simultaneously transmits to intelligent connection manager 110 more subscriber requests (e.g., 30 requests) to obtain performance data from one or more other target devices 130 (e.g., one or more switches). Similar to that previously described, validator 205 validates these subscriber requests and subscriber information manager 210 tracks session information. Subscriber information manager 210 verifies service level agreement parameters. In this case, however, the number of concurrent requests being serviced exceeds the limit of 50 requests.

Figure 5D:
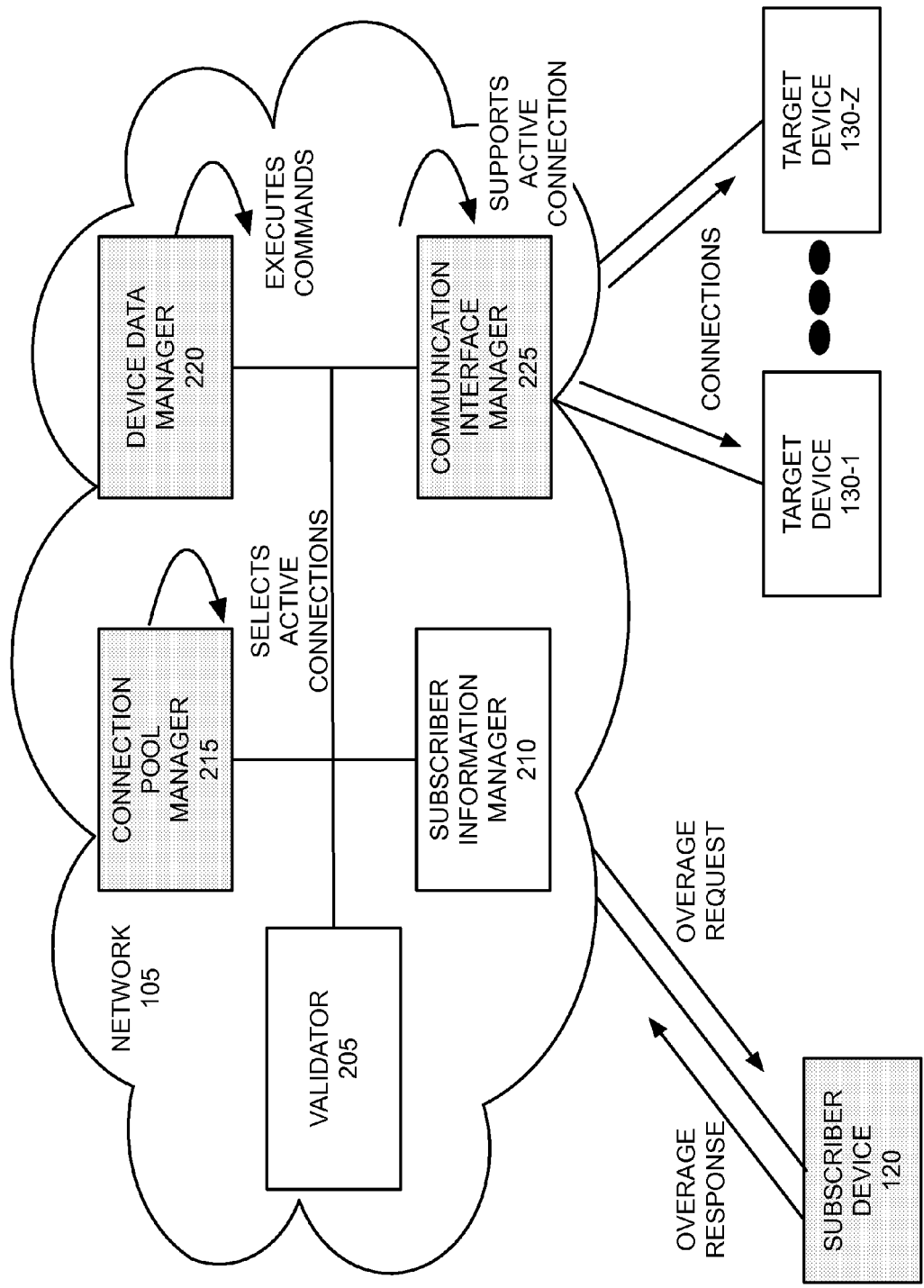

Referring to FIG. 5D, according to an exemplary implementation, 25 of the 30 requests are serviced by intelligent connection manager 210 in a manner similar to that previously described. Additionally, the 5 requests in excess of 50 are queued. As illustrated, intelligent connection manager 110 transmits an overage request to subscriber device 120 or some other device (not illustrated). The overage request includes a request as to whether to increase the service limit (e.g., to 75 concurrent requests). Subscriber device 120 or the other device may grant permission to increase the service limit. According to this exemplary scenario, assume that subscriber device 120 transmits to intelligent connection manager 110 an overage response indicating to increase the service limit. In response, connection pool manager 215 creates or establishes additional active connections to target devices 130 for the queued requests. Communication interface manager 225 supports the active connections relative to target devices 130, and device data manager 220 executes commands pertaining to target devices 130. Although not illustrated, assume that target devices 130 provide performance data and this performance data is transmitted to subscriber device 120.

According to other scenarios, subscriber device 120 or the other device may not grant permission to intelligent connection manager 110 to increase the service limit. According to an exemplary implementation, intelligent connection manager 110 continues to queue the requests until the concurrent connections are below the service limit of 50. When the concurrent connections fall below 50, intelligent connection manager 110 may create the required number of additional connections. Alternatively, if unused active connections become available, intelligent connection manager 110 may select and use the newly available unused, active connections.

Figure 5E:
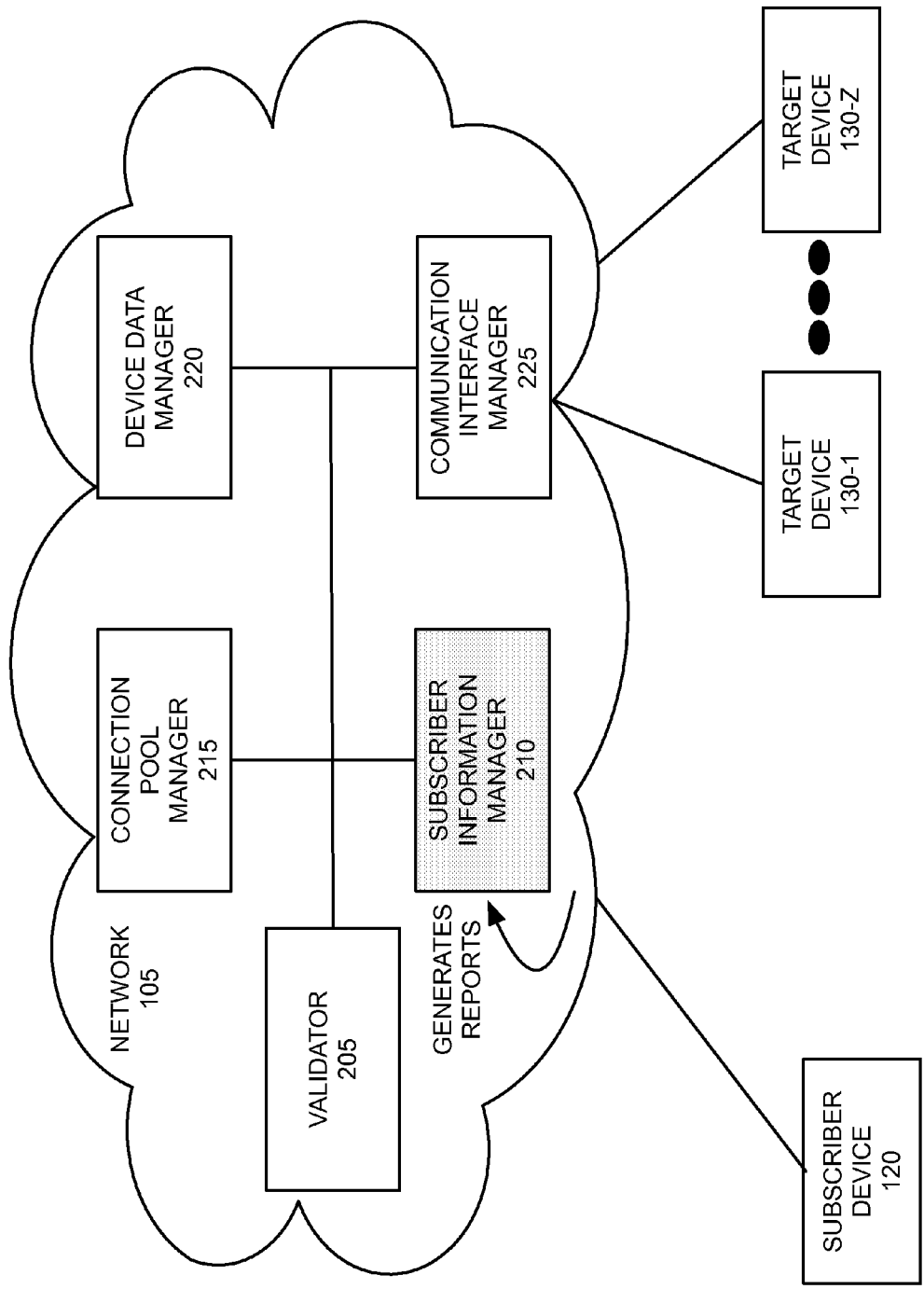

Referring to FIG. 5E, subscriber information manager 210 generates a report. The report includes usage information. Additionally, according to this scenario, the report indicates that a service limit was exceeded and that permission was granted to increase the service limit.

Figure 6A:
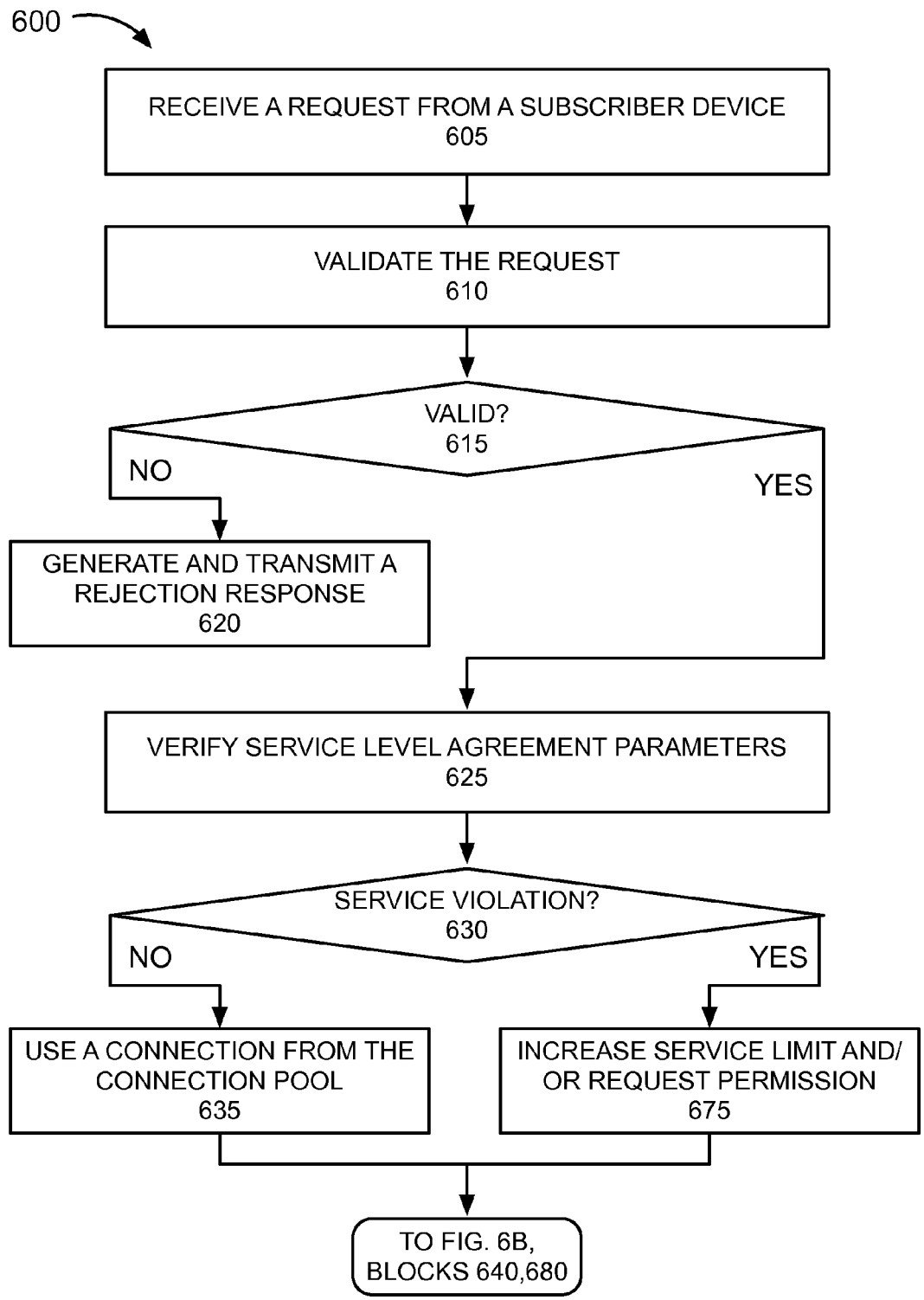
FIGS. 6A-6C are flow diagrams illustrating an exemplary process performed by an intelligent connection manager.
Figure 6B:
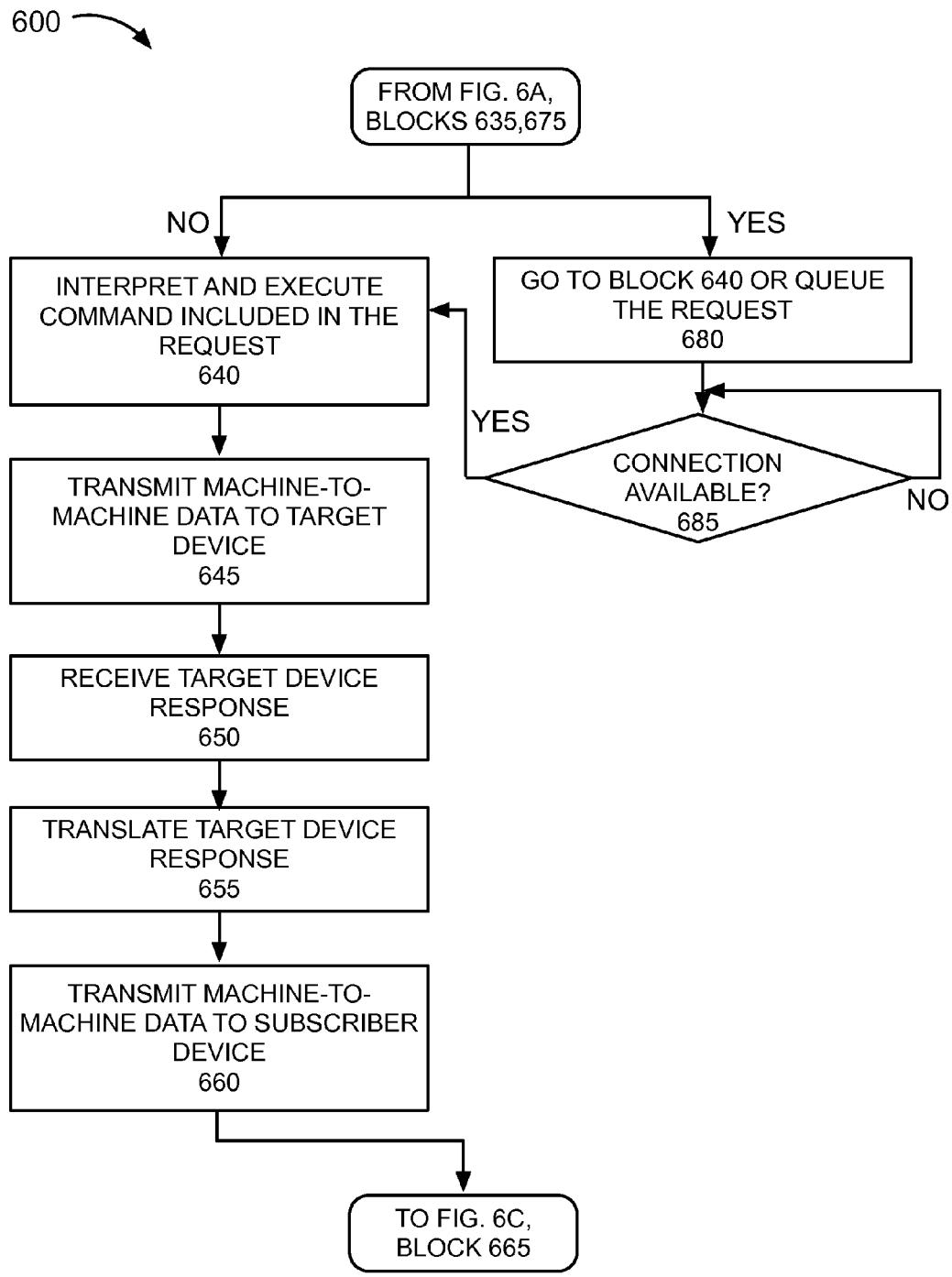
Figure 6C:
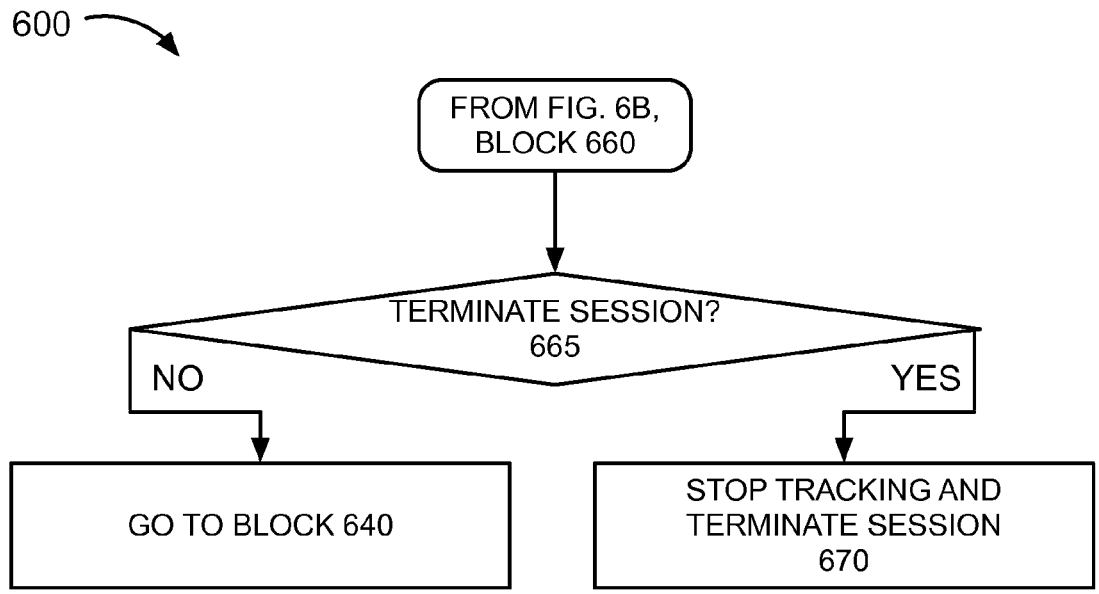

FIGS. 6A-6C are flow diagrams illustrating an exemplary process performed by an intelligent connection manager 110. For example, one or more components or devices of intelligent connection manager 110 include processor(s) 305 that execute(s) software 315 to perform one or more of the steps of process 600.

Process 600 may begin with receiving a request from a subscriber device (block 605). For example, subscriber device 120 transmits a request to intelligent connection manager 110 for connection services.

In block 610, the request is validated. For example, validator 205 of intelligent connection manager 110 validates the request. As previously described, according to an exemplary implementation, a validation process may include authentication, authorization, verifying syntax, format, etc., pertaining to data included in the request.

In block 615, it is determined whether the request is valid. If it is determined that the request is not valid (block 615-NO), then a rejection response is generated and transmitted to the subscriber device (block 620). For example, validator 205 generates a rejection response and intelligent connection manager 110 transmits the rejection response to subscriber device 120.

If it is determined that the request is valid (block 615-YES), then service level agreement terms are verified (block 625). For example, subscriber information manager 210 of intelligent connection manager 110 verifies service level agreement parameters pertaining to the subscriber associated with subscriber device 110. These service level agreement parameters include usage parameters (e.g., specified target devices, usage limits, etc.) pertaining to connection services.

In block 630, it is determined whether a service violation exists. For example, subscriber information manager 210 may compare state information associated with intelligent connection manager 110 to the service level agreement parameters to determine whether a service violation would exist based on the servicing of this request. For example, subscriber information manager 110 compares the number of concurrent connections included in the state information to the permissible limit/number of concurrent connections included in the subscriber information. If it is determined that there is no potential service violation (block 630-NO), then an active connection to the target device is selected from the pool (block 635). For example, connection pool manager 215 selects an active connection to target device 130 indicated in the request. Additionally, subscriber information manager 210 tracks session information pertaining to the request and subsequent operations associated with the connection services.

Referring to FIG. 6B, in block 640, one or more commands included in the request are interpreted and executed. For example, device data manager 220 of intelligent connection manager 110 interprets and executes commands directed to target device 130. For example, subscriber device 120 may include provisioning or activation software that needs to add or create a new service. Under such circumstances, device data manager 220 executes, on behalf of subscriber device 120, activation commands to activate the service on target device 130. According to another example, subscriber device 120 may include repair or diagnostic software for troubleshooting issues pertaining to target device 130. Under such circumstances, device data manager 220 executes, on behalf of subscriber device 120, diagnostic and/or repair commands to diagnosis or repair target device 130.

In block 645, machine-to-machine data is transmitted to the target device. For example, device data manager 220 transmits the one or more commands to target device 130. Device data manager 220 may transmit other machine-to-machine data either included in the request or data that is relevant to the one or more commands.

In block 650, a response from the target device is received. For example, intelligent connection manager 110 receives a response from target device 130. In block 660, a response from the target device is translated. For example, device data manager 220 converts response data received from target device 130 to a format understandable to subscriber device 120 (e.g., according to a service level agreement parameter). In block 660, machine-to-machine data is transmitted to the subscriber device. For example, intelligent connection manager 110 transmits the converted response data to subscriber device 120. Referring to FIG. 6C, block 665, it is determined whether to terminate the session. For example, subscriber device 120 may transmit a termination message to intelligent connection manager 110 when the session is to be terminated. If it is determined that the session is not to be terminated (block 665-NO), the process 600 continues to block 640. For example, intelligent connection manager 110 may receive another request, and intelligent connection manager 110 processes the request. If it is determined that the session is to be terminated (block 665-YES), then tracking of the session is stopped and the session is terminated (block 670).

Referring back to FIG. 6A, if it is determined that there exists a service violation (block 630-YES), then a service limit is increased and/or permission is requested (block 675). According to an exemplary implementation, intelligent connection manager 110 increases a service limit (e.g., a connection service usage limit, etc.) according to the service level agreement. For example, the service level agreement may provide for a temporary or permanent increase of a usage limit. The temporary or permanent increase may be provisioned without further subscriber permission. According to another implementation, intelligent connection manager 110 requests permission from subscriber device 120 (or some other device, subscriber, etc.) to increase or adapt provisioning of connection services to accommodate the request in view of the service violation. For example, intelligent connection manager 110 transmits a service modification request message to subscriber device 120 (or some other device, subscriber, etc.) that requests permission to adapt the terms of the service level agreement. Subscriber device 120 (or some other device, subscriber, etc.) transmits a service modification response message granting or denying permission to intelligent connection manager 110.

Referring to FIG. 6B, in block 680, in the event that permission is requested and denied, the request remains queued. In block 685, it is determined whether a connection is available. For example, if the service violation pertains to a connection overage, intelligent connection manager 110 identifies when the number of current connections is reduced to permit a queued request to be serviced. When this occurs, intelligent connection manager 110 determines whether an active connection is available. If there is not an available connection (block 685-NO), intelligent connection manager 110 waits for an active connection. If there is an available connection (block 685-YES), connection pool manager 215 selects an active connection from the pool and process 600 continues to block 645. Alternatively, referring back to block 680, in the event that permission is requested and granted, connection pool manager 215 selects an active connection from the pool and process 600 continues to block 640.

Although FIGS. 6A-6C illustrates an exemplary process 600 for providing communication gap information, according to other embodiments, process 600 may include additional operations, fewer operations, and/or different operations than those illustrated in FIGS. 6A-6C. For example, in the event that an active connection is not available to a target device 130, connection pool manager 215 may queue requests until an active connection is established, create a new active connection, etc., as previously described. This may occur even if the request is validated and there is no service violation. For example, there may be a network problem or target device 130 may be performing an upgrade that prevents interruption and/or connections to target device 130. Additionally, for example, there may be cases when a request does not include commands to execute. According to such instances, block 645 may be omitted. Additionally, or alternatively, there may be cases when machine-to-machine data does not require translation. According to such instances, block 665 may be omitted.

According to an exemplary embodiment, intelligent connection manager 110 is implemented as an elastic cloud in which dynamic allocation and de-allocation of resources for a subscriber may be provided. Intelligent connection manager 110 provides a standardized elastic platform that manages and delivers connections to various network devices for other network devices that request access to the various network devices. Intelligent connection manager 110 provides a transparent for of access to these various network devices. Intelligent connection manager 110 also provides resource adjustments that are responsive to subscriber usage of the connection services. In this way, terms of a service level agreement are flexible to dynamically adapt to subscriber access and usage needs.

According to an exemplary implementation, intelligent connection manager 110 provides a standardized form of access to various network devices (e.g., Extensible Markup Language (XML), etc.). According to an exemplary implementation, intelligent connection manager 110 provides a secured, single-point access.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 6A-6C, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 305, etc.), a combination of hardware and software (e.g., software 315), a combination of hardware and firmware, or a combination of hardware, firmware, and software. The embodiments have been described without reference to the specific software code since software can be designed to implement the embodiments based on the description herein. Software may be stored by a non-transitory storage medium including, for example, memory/storage 310.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
   receiving, by a network device, a request from a subscriber device for a connection service pertaining to a machine-to-machine communication;
   determining, by the network device, whether the request is a valid request for the connection service;
   selecting, by the network device, a connection to a target device of the machine-to-machine communication in response to determining that the request is valid;
   executing, by the network device, a command included in the request to be directed to the target device;
   receiving, by the network device, a response from the target device;
   transmitting, by the network device, the response to the subscriber device of the machine-to-machine communication;
   determining whether a service level violation exists based on service level agreement parameters relative to the subscriber device;
   requesting permission from the subscriber device to modify one or more service level agreement parameters in response to a determination that a service level violation exists pertaining to the request;
   modifying the one or more service level agreement parameters if permission is granted; and
   queuing the request if permission is not granted until connection service usage pertaining to the subscriber device changes to allow for a provisioning of the connection service relative to the queued request.

2. The method of claim 1, further comprising:
   maintaining active connections to target devices associated with potential machine-to-machine communications; and
   determining whether a service level violation exists based on service level agreement parameters relative to the subscriber device, wherein the selecting comprises:
   selecting the connection, from the active connections, to the target device in response to determining that the service level violation does not exist.

3. The method of claim 2, further comprising:
   requesting permission to modify one or more service level agreement parameters relative to the subscriber device in response to determining that a service level violation exists; and
   queuing the request if permission is not granted.

4. The method of claim 3, further comprising:
   modifying the one or more service level agreement parameters if permission is granted; and
   selecting the connection to the target device in response based on the modifying.

5. The method of claim 1, further comprising:
   tracking session information pertaining to the connection between the subscriber device, the network device, and the target device.

6. The method of claim 1, further comprising:
   translating the response to a format compatible to the subscriber device.

7. The method of claim 1, further comprising:
   transmitting a rejection to the connections service in response to determining that the request is not valid.

8. The method of claim 1, wherein the determining comprises:
   performing a validation process that includes authentication, authorization, and syntax verification pertaining to the request.

9. A system comprising:
   one or more memories that store instructions; and
   one or more processors to execute the instructions to:
   receive a request from a subscriber device for a connection service pertaining to a machine-to-machine communication;
   determine whether the request is a valid request for the connection service;
   select a connection to a target device of the machine-to-machine communication in response to a determination that the request is valid;
   execute a command included in the request to be directed to the target device;
   receive a response from the target device;
   transmit the response to the subscriber device of the machine-to-machine communication;
   determine whether a service level violation exists based on service level agreement parameters relative to the subscriber device;
   request permission from the subscriber device to modify one or more service level agreement parameters in response to a determination that a service level violation exists pertaining to the request;
   modify the one or more service level agreement parameters if permission is granted; and
   queue the request if permission is not granted until connection service usage pertaining to the subscriber device changes to allow for a provisioning of the connection service relative to the queued request.

10. The system of claim 9, wherein the one or more processors further execute the instructions to:
    determine whether a service level violation exists based on service level agreement parameters relative to the subscriber device, and wherein when selecting, the one or more processors further execute the instructions to:
    select the connection to the target device in response to a determination that the service level violation does not exist.

11. The system of claim 10, wherein the one or more processors further execute the instructions to:
maintain a pool of active connections to target devices associated with potential machine-to-machine communications, and wherein when selecting, the one or more processors further execute the instructions to:
select the connection to the target device from the pool of active connections, wherein the service level violation pertains to an overage of a number of connections.

12. The system of claim 10, wherein the one or more processors further execute the instructions to:
transmit a message to the subscriber device requesting to modify one or more service level agreement parameters relative to the subscriber device in response to a determination that a service level violation exists; and
queue the request in response to a determination that a service level violation exists.

13. The system of claim 12, wherein the one or more processors further execute the instructions to:
receive a message from the subscriber device;
determine whether the message from the subscriber grants permission to modify the one or more service level agreement parameters;
modify the one or more service level agreement parameters in response to a determination that the message from the subscriber grants permission; and
select the connection to the target device based on one or more modifications to the one or more service level agreement parameters.

14. The system of claim 9, wherein the one or more processors further execute the instructions to:
track session information pertaining to the connection between the subscriber device, the network device, and the target device;
generate a report based on the session information; and
allow a subscriber to obtain the report.

15. The system of claim 9, wherein the system includes a cloud computing system.

16. A non-transitory storage medium storing instructions executable by a computational device to:
receive a request from a subscriber device for a connection service pertaining to a machine-to-machine communication;
determine whether the request is a valid request for the connection service;
select a connection to a target device of the machine-to-machine communication in response to a determination that the request is valid;
execute a command included in the request to be directed to the target device;
transmit machine-to-machine data to the target device using the selected connection;
receive a response from the target device;
transmit the response to the subscriber device of the machine-to-machine communication;
determine whether a service level violation exists based on service level agreement parameters relative to the subscriber device;
request permission from the subscriber device to modify one or more service level agreement parameters in response to a determination that a service level violation exists pertaining to the request;
modify the one or more service level agreement parameters if permission is granted; and
queue the request if permission is not granted until connection service usage pertaining to the subscriber device changes to allow for a provisioning of the connection service relative to the queued request.

17. The non-transitory storage medium of claim 16, further storing instructions executable by the computational device to:
maintain a pool of active connections to target devices associated with potential machine-to-machine communications; and
select the connection to the target device from the pool of active connections.

18. The non-transitory storage medium of claim 16, further storing instructions executable by the computational device to:
track session information pertaining to the connection between the subscriber device, the network device, and the target device;
generate a report based on the session information; and
allow a subscriber to obtain the report.

19. The non-transitory storage medium of claim 16, further storing instructions executable by the computational device to:
execute a command included in the request to cause the target device to execute one or more commands.

* * * * *